US011389755B2

(12) United States Patent
Amaral et al.

(10) Patent No.: US 11,389,755 B2
(45) Date of Patent: Jul. 19, 2022

(54) FILTER ELEMENT FOR A FILTER DEVICE

(71) Applicant: Mahle International GmbH, Stuttgart (DE)

(72) Inventors: Tadeu Miguel Malago Amaral, Rochester, MI (US); Edson Valdomiro De Azevedo, Jr., Rochester Hills, MI (US); Stefan Jauss, Donzdorf (DE); Fernando Yoshino, Rochester, MI (US); Fabio Moreira, Sterling Heights, MI (US)

(73) Assignee: Mahle International GmbH

( * ) Notice: Subject to any disclaimer, the term of this patent is extended or adjusted under 35 U.S.C. 154(b) by 159 days.

(21) Appl. No.: 16/706,664

(22) Filed: Dec. 6, 2019

(65) Prior Publication Data
US 2020/0179843 A1 Jun. 11, 2020

(30) Foreign Application Priority Data
Dec. 7, 2018 (DE) ...................... 10 2018 221 262.7

(51) Int. Cl.
*B01D 35/153* (2006.01)
*B01D 29/13* (2006.01)
*B01D 35/30* (2006.01)
*F01M 11/03* (2006.01)
*B01D 35/16* (2006.01)

(52) U.S. Cl.
CPC ........... *B01D 35/153* (2013.01); *B01D 29/13* (2013.01); *B01D 35/30* (2013.01); *F01M 11/03* (2013.01); *B01D 2201/0415* (2013.01); *B01D 2201/0453* (2013.01); *F01M 2011/031* (2013.01)

(58) Field of Classification Search
CPC ............ B01D 35/153; B01D 2201/291; B01D 2201/305; B01D 2201/4015; B01D 27/08; F01M 11/03; F01M 2011/031
USPC ........................................ 210/234, 235, 248
See application file for complete search history.

(56) References Cited

U.S. PATENT DOCUMENTS

| 3,363,762 A | * | 1/1968 | Ensign | ................... | B01D 29/23 |
| | | | | | 210/136 |
| 6,706,181 B1 | * | 3/2004 | Baumann | ............... | B01D 29/21 |
| | | | | | 210/236 |
| 9,555,351 B2 | | 1/2017 | Grass et al. | | |

(Continued)

FOREIGN PATENT DOCUMENTS

DE 20 2007 001 227 U1 8/2008
DE 10 2016 124 587 A1 6/2018

(Continued)

OTHER PUBLICATIONS

English abstract for EP-10 2016 124 587.

*Primary Examiner* — Benjamin M Kurtz
(74) *Attorney, Agent, or Firm* — Fishman Stewart PLLC

(57) ABSTRACT

A filter element for a filter device may include a support structure extending along an axial direction, on which on a circumference side an annular filter medium consisting of filter material may be arranged, and an annular first end disc having a passage opening through which a first pin element may be passed, so that the first pin element may project out of the passage opening along the axial direction, wherein a second pin element may axially project from the first end disc laterally spaced apart from the first pin element.

9 Claims, 11 Drawing Sheets

(56) References Cited

U.S. PATENT DOCUMENTS

| | | | |
|---|---|---|---|
| 2007/0256965 A1* | 11/2007 | Klein | B01D 29/96 210/110 |
| 2008/0190832 A1* | 8/2008 | Schachtrup | B01D 35/153 210/234 |
| 2018/0161708 A1 | 6/2018 | Morris et al. | |
| 2019/0046905 A1* | 2/2019 | Roy | B01D 36/005 |

FOREIGN PATENT DOCUMENTS

| | | |
|---|---|---|
| EP | 3 146 171 A1 | 3/2017 |
| EP | 2 222 384 B1 | 2/2018 |
| WO | 2011/047913 A1 | 4/2011 |
| WO | 2015/177318 A1 | 11/2015 |

* cited by examiner

FILTER ELEMENT FOR A FILTER DEVICE

CROSS-REFERENCE TO RELATED APPLICATIONS

This application claims priority to German Patent Application DE 10 2018 221 262.7, filed Dec. 7, 2018, the contents of which are incorporated by reference their entirety.

TECHNICAL FIELD

The invention relates to a filter element for a filter device and to a preassembly group having such a filter element. The invention, furthermore relates to an assembly group comprising such a preassembly group and to a filter device having such an assembly group for filtering a fluid, in particular oil, additives, fuel, water or coolant. Finally, the invention relates to an internal combustion engine having such a filter device.

BACKGROUND

Filter systems for oil change cells of internal combustion engines have been known for some time. Such an oil change cell is described for example in EP 3 146 171 A1. The cell contains the oil of the oil circuit. Thus, the oil during an oil change need not be drained in the workshop as usual but in the service event only the oil change cell has to be replaced. In this way, the oil change becomes quicker and cleaner.

SUMMARY

It is an object of the present invention to show new ways in the development of such filter systems.

According to the invention, this object is solved through the subject of the independent patent claims. Advantageous embodiments are subject of the dependent claims.

Accordingly, the basic idea of the invention is to equip a filter element with two pin elements which are arranged axially projecting from the filter element and laterally spaced apart from one another. In a state of the filter element installed in a filter housing, the two pin elements are suitable for actuating two different valve bodies by means of which valve openings formed on the filter housing can be optionally closed or opened. In the opened state of the two valve openings, raw or clean oil accumulated in the filter element on the raw and clean side can be specifically drained into the surroundings of the filter element. Conversely, an uncontrolled leakage of the raw or clean oil in the closed state of the valve openings is prevented.

With the help of the said pin elements it can be prevented that raw oil or clean oil from the raw or clean side can get through the valve openings into the outer surroundings of the filter housing. The provision of a separate valve device, in particular separate actuation bodies for actuating the valve bodies, is not required with the filter element introduced here. This simplifies the construction of the entire filter device.

A filter element for a filter device according to the invention comprises a support structure extending along an axial direction, on which on the circumference side an annular filter medium consisting of filter material is arranged. The filter material, furthermore, comprises an annular (first) end disc, whose passage opening is passed through by a first pin element, so that it axially projects out of the passage opening. Apart from this, a second pin element projects from the (first) end disc laterally spaced apart from the first pin element along the axial direction.

According to a preferred embodiment, the first pin element and the first end disc are arranged concentrically relative to one another. This allows using a ring filter element in which a concentrically arranged valve opening for draining raw or clean oil is employed. By providing a suitably formed valve body on the first pin element, the said valve opening can thus be very easily opened and closed again for raw or clean oil to flow through.

Particularly preferably, the second pin element is arranged eccentrically on the first end disc. This allows using an eccentrically arranged valve opening for draining clean or raw oil. By providing a suitably formed valve body on the second pin element, the said additional valve opening can thus be easily opened and closed again for clean or raw oil to flow through.

The support structure is particularly practically formed as grating structure with tubular geometry which limits a tubular body interior, in which the first pin element extends. The formation as grating structure brings about that a pressure loss in the oil flowing through the filter medium can be kept low.

According to an advantageous further development, the filter element comprises a second end disc which is axially located opposite the first end disc, so that the filter medium is axially arranged between the two end discs. In this further development, the support structure is connected to the second end disc and stands away from the same towards the first end disc. A filter element according to this further development proves to be particularly stable mechanically.

Practically, the two pin elements, the support structure and the two end discs can be formed material-uniformly. Thus, the same material can be used for producing these components which results in cost advantages.

Practically, the first pin element is integrally moulded on the second end disc and the second pin element integrally on the second end disc. This embodiment also has an advantageous effect on the production costs.

According to a particularly preferred embodiment, the first or/and the second pin element has the geometry of a cross in a cross section perpendicularly to the axial direction. On pin elements having such a cruciform geometry, valve bodies of different type can be mounted particularly easily.

Particularly preferably, a first valve body and a second valve body are arranged on the first pin element and on the second pin element respectively, in each case for closing a valve opening. Providing separate valve bodies for closing the valve openings is thus no longer required.

According to an advantageous further development, a fastening device for the adjustable connecting of the filter element to a filter housing cover is provided on a side of the second end disc facing away from the filter medium. Such a fastening device facilitates fastening the filter element on the filter housing cover.

The invention, furthermore, relates to a preassembly group for a fluid cell, in particular for an oil cell, of a filter device which comprises a filter housing limiting a housing interior, which comprises an open-design filter housing bowl and a filter housing cover for closing the filter housing bowl. The preassembly group, furthermore, comprises a filter element explained above which is replaceably arranged in the filter housing interior, which filter element subdivides the housing interior into a raw side and into a clean side. Here, the filter element comprises an annular (first) end disc whose passage opening is passed through by a first pin element, so that it projects out of the passage opening along the axial direction. A second pin element axially projects from the (first) end disc laterally spaced apart from the first pin element. The preassembly group, furthermore, comprises a first valve body arranged on the first pin element and a second valve body arranged on the second pin element. Here, the filter housing cover is detachably fastened to the filter housing bowl. On the filter housing cover, a first valve opening is arranged together with which the first valve body forms a first valve device. Analogously to this, a second valve opening is arranged on the filter housing cover, together with which the second valve body forms a second valve device. Here, the filter housing bowl and the filter housing cover are matched to one another in such a manner that the filter housing cover can be inserted into the filter housing bowl.

In a preferred embodiment, the preassembly group comprises a support structure extending along an axial direction, on which on the circumference side an annular filter medium consisting of filter material is arranged.

An embodiment in which the two valve openings are arranged on a cover bottom of the filter housing cover proves to be particularly installation space-saving.

In another preferred embodiment, the filter housing cover comprises a cover bottom from which axially a cover collar projects. Practically, the cover collar is integrally moulded on the cover bottom. In this embodiment the cover collar, for forming a plug connection in the inserted state in the filter housing bowl with an axial end portion facing away from the cover bottom, lies against a circumferential wall of the filter housing bowl.

Practically, the filter element replaceably arranged in the housing interior can be adjusted from an operating position, in which the filter element is fixed on the filter housing, through a rotation in the fluid cell housing, into a disassembly position in which, with the filter housing cover removed from the filter housing bowl, it can be removed from the filter housing bowl through a movement along the axial direction relative to the open filter housing bowl.

Particularly preferably, the filter element arranged in the housing interior is detachably connected to the filter housing bowl by means of a suitable connection, in particular a bayonet or clip-type connection.

Practically, a positioning aid of tubular design for positioning the filter element with the pin elements relative to the valve openings provided on the filter housing cover is formed on the filter housing cover.

The invention, furthermore, relates to an assembly for a filter device which comprises the preassembly group introduced above. The advantageous of the preassembly group explained above therefore apply also to the assembly group. The assembly group additionally comprises a fluid cell which comprises a fluid cell housing, in which the preassembly group is receivable or received. According to the invention, the filter housing cover of the filter housing is fixable or fixed on the fluid cell by means of a bayonet joint.

Practically, a fluid cell opening is provided in the fluid cell housing, in which the preassembly group with the filter housing bowl can be inserted. Here, the filter housing cover fixed on the fluid cell housing by means of the bayonet joint blocks an axial removal of the filter housing bowl from the fluid cell housing. In this way, it is thus not only the filter housing cover but also the filter housing bowl with the filter element which in turn is also connected to the filter housing bowl by means of a clip-type connection, is fixed on the fluid cell.

Particularly preferably, the axial fixing of the filter housing cover on the fluid cell housing can be disabled by a rotational movement of the filter housing cover relative to the fluid cell housing so that with released fastening the filter housing cover can be axially moved from the fluid cell housing. This function can be taken over by the bayonet joint which is substantial for the invention and allows a worker a simple disassembly of the assembly group or preassembly group.

In a preferred embodiment, the filter housing cover is designed so that it can be axially inserted in an insertion position in the fluid cell housing in which it can be again axially removed from the fluid cell housing. In this embodiment, the filter housing cover is additionally formed so that in the insertion position it can be rotated relative to the fluid cell housing into an operating position in which it is axially fixed in the fluid cell housing.

Particularly preferably, the filter housing bowl and the filter housing cover are therefore designed or matched to one another in such a manner that the filter housing cover and the filter housing bowl can be axially adjusted relative to one another even in the operating position up to a predetermined maximum axial stroke.

Practically, the first pin element, both in the disassembly position and also in the operating position of the filter housing cover, is aligned with the first valve opening of the first valve device and the second pin element with the second valve opening of the second valve device. In this way, the correct positioning of the two pin elements with the respective valve body relative to the valve openings is ensured.

Particularly preferably, the filter housing cover and the fluid cell housing are designed and matched to one another in such a manner that the axial fixing of the filter housing cover on the fluid cell housing can be disabled by rotating the filter housing cover relative to the fluid cell housing. With released fastening, the filter housing cover can thus be axially removed from the fluid cell housing.

Practically, the filter housing cover is formed in such a manner that it can be axially inserted in the fluid cell housing into a disassembly position, in which it can be again axially removed from the fluid cell housing. In this version, the filter housing cover is additionally formed also in such a manner that in the disassembly position it can be rotated relative to the filter housing bowl into an operating position in which it is axially fixed in the fluid cell housing. "Axially fixed" is to mean that it is not possible in the operating position to again axially remove the filter housing cover completely from the fluid cell housing.

Practically, a fold-out handle for axially removing the filter housing cover from the filter housing bowl and for rotating the filter housing cover relative to the filter housing bowl can be practically provided on the filter housing cover. Particularly practically, this handle is formed as a flap or as foldable. This measure facilitates inserting the filter housing cover in the filter housing bowl.

In an advantageous further development, the handle it designed so as to be foldable or pivotable about a pivot axis which extends orthogonally to the axial direction. It is to be understood that this direction definition relates to the state of the filter housing cover inserted in the filter housing bowl.

For fixing the handle and thus the entire filter housing cover on the fluid cell of a filter device, two fastening elements can be provided on the handle as part of the bayonet joint, which are preferably formed in the manner of extensions. Practically, the said fastening elements extend the handle along the pivot axis and are located opposite one another along the pivot axis.

In a further preferred embodiment, two recesses which are complementary to the two fastening elements are provided on the filter housing bowl as part of the bayonet joint, in which the two fastening elements or extensions, with the filter housing cover inserted in the filter housing bowl, engage. A rotational movement of the handle thus results in that this filter housing bowl is driven and in this way adjusted from the disassembly position into the operating position.

In a further preferred embodiment, at least one recess, preferentially two recesses are provided on the fluid cell housing as part of the bayonet joint, in which the fastening elements provided on the filter housing cover can engage. Particularly preferably, two such recesses are provided. In this way, the bayonet joint can be installation space-savingly integrated in the fluid cell.

Practically, the fluid cell housing and the filter housing bowl of the filter housing are designed and matched to one another so that the filter housing bowl can be axially inserted into the fluid cell housing in such a manner that following the insertion the recess(es) provided on the filter cell housing and the recesses provided on the filter housing bowl are aligned with one another. In this way it is possible without further assembly steps to insert the filter housing cover into the filter housing bowl so that it is in the insertion position. Thus, a rotational adjusting of the filter housing cover into the operating position can take place directly after the insertion of the filter housing cover in the filter housing bowl in order to bring about the desired fixing both of the housing cover and also of the filter housing bowl on the fluid cell housing in this way.

A further preferred embodiment, in which the at least one recess provided on the fluid cell housing and forming the bayonet joint is formed as receiving groove, which is arranged on the inside of a circumferential wall of the fluid cell housing forming a fastening flange proves to be realisable in a technically simple manner. In this embodiment, the receiving groove comprises an axially extending first groove portion for axially inserting the filter housing cover in the filter housing bowl and in the insertion position. This first groove portion merges into a second groove portion extending along the circumferential direction for rotationally adjusting the filter housing cover from the insertion position into the operating position.

In a further preferred embodiment, the two fastening elements of the handle, following the insertion of the filter housing cover in the insertion position, engage in the at least one recess provided on the fluid cell housing and forming a part of the first bayonet joint. At the same time, the two fastening elements radially engage through the recesses provided on the filter housing bowl. In this way, the filter housing bowl with the filter element is driven from the insertion position into the operating position during the rotational adjusting of the filter housing cover.

The invention, furthermore, relates to a filter device for an internal combustion engine. The filter device according to the invention comprises a filter head which in turn comprises a flange for connecting the fluid cell of the assembly group. The filter device comprises an assembly group introduced above so that the advantages of this assembly group explained above also apply to the filter device according to the invention. According to the invention, the filter device comprises a raw oil connection and a clean oil connection, both of which are provided on the filter head. There, the raw oil connection fluidically communicates with the first valve opening of the assembly group and the clean oil connection fluidically communicates with the second valve opening of the assembly group. Obviously, an obverse assignment of the two connections to the two valve openings is also possible in versions.

According to an advantageous further development, the filter device comprises an adjusting device by means of which the filter housing bowl is axially adjustable with the filter element and the pin elements provided on the filter element relative to the filter housing with the valve openings between a closed position and an opening position. In the closed position, the pin elements provided on the filter element close the valve openings in a fluid-tight manner. In the open position, the pin elements open the valve openings for raw or clean oil to flow through. This further development allows a worker to specifically operate the valve devices by means of the adjusting device. In particular it can be thus ensured that the valve openings are opened only in particular when the assembly group is arranged on the filter head. An undesirable leakage of oil from the filter cell can thus be avoided.

Practically, the filter head and the assembly group can be equipped or matched to one another in such a manner that the two pin elements close the two valve openings, i.e. the filter housing bowl is arranged in the closed position for as long as the assembly group is not arranged on the filter head. In this way it is ensured that no raw or clean oil present in the housing interior on the raw or clean side can leak from the fluid cell into the outer surroundings and cause contaminations.

Practically, the filter head and the assembly group are equipped or matched to one another in such a manner that the filter housing bowl is in the closed position for as long as the assembly group is not arranged on the filter head. In this way it is also ensured that no raw or clean oil present in the housing interior on the raw or clean side can leak from the fluid cell into the outer surroundings contaminating the same.

Particularly practically, the filter head and the assembly group are equipped or matched to one another in such a manner that an adjusting of the filter housing bowl from its closed position into its open position, preferentially by means of the adjusting device, is only possible with the assembly group arranged on the filter head.

Practically, at least the second groove portion of the receiving groove that is present on the fluid cell housing and forms a part of the bayonet joint is axially dimensioned in such a manner that the filter housing bowl can be axially adjusted between the open position and the closed position.

According to an advantageous further development, the adjusting device, with the assembly group fitted onto the flange, is mechanically connected to the filter housing bowl. In this further development, the adjusting device is designed in such a manner that a rotational movement of the adjusting device fluid cell housing is accompanied by an axial adjusting movement of the adjusting device and thus of the filter housing bowl. Such a design of the adjusting device facilitates operating the fluid cell.

Practically, the adjustable mechanical connection between the filter housing bowl and the adjusting device or its adjusting body can be realised by way of a filter head bayonet joint. Such a bayonet joint is technically easily realisable and thus cost-effective.

According to an advantageous further development, the adjusting device comprises an annular adjusting body which in the state of the assembly group or preassembly group mounted on the fluid cell is mechanically adjustably connected to the filter housing bowl.

Practically, the filter head bayonet joint can comprise at least one receiving groove formed on the adjusting body, which along the circumferential direction has an axial gradient. In this version, the filter head bayonet joint comprises at least one projection arranged outside on the filter housing bowl which in the state of the assembly group or preassembly group mounted on the filter head engages in the receiving groove.

A further preferred embodiment, in which the receiving groove provided on the adjusting body and the projection of the filter head bayonet joint provided on the filter housing bowl are matched to one another in such a manner that a rotation of the adjusting body fluid cell housing A brings about an axial movement of the filter housing bowl so that the filter housing bowl is adjusted between the open position and the closed position proves to be particularly easy to operate for a worker.

According to an advantageous further development, a third pin element with a third valve body can be provided on the filter housing bowl, by means of which a third valve opening formed on the filter housing cover is closable. When the preassembly group is mounted on the fluid cell the third valve device formed by the third valve opening and the third valve body can be arranged in a fluid line which fluidically connects a fluid cell housing interior limited by the fluid cell housing with an additional oil connection provided on the filter head. In this way—analogously to the first and second valve device—the oil flow of the oil flow stored in the fluid cell can be stored in the filter head. In particular, an undesirable leakage of oil from the fluid cell can be avoided.

In a further preferred embodiment, the third valve body and the third valve opening form a third valve device which is arranged in a fluid line which fluidically connects the fluid cell housing interior limited by the fluid cell housing with an additional oil connection provided on the filter head. In this way, the inflow and outflow of the oil stored in the filter housing interior can be controlled and in particular an undesirable oil leakage prevented.

The invention, furthermore, relates to an internal combustion engine with the filter device introduced above, so that the advantages of the filter device explained above also apply to the internal combustion engine.

Further important features and advantages of the invention are obtained from the subclaims, from the drawing and from the associated figure description by way of the drawing.

It is to be understood that the features mentioned above and still to be explained in the following cannot only be used in the respective combination stated but also in other combinations or by themselves without leaving the scope of the present invention.

BRIEF DESCRIPTION OF THE DRAWINGS

A preferred exemplary embodiment of the invention is shown in the drawing and is explained in more detail in the following description.

It shows, in each case schematically.

DETAILED DESCRIPTION

Figure 1:
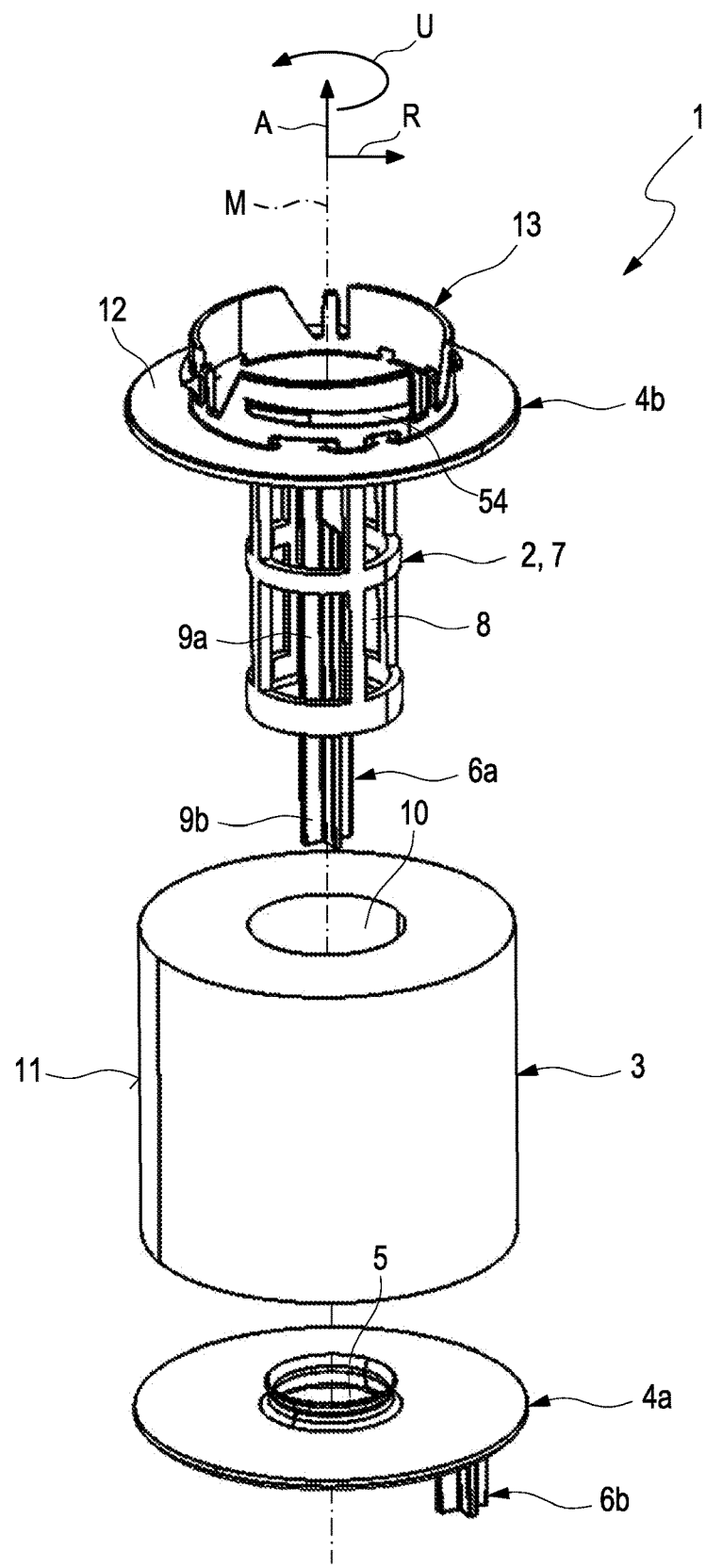
FIG. 1 the components of the filter element according to the invention in a non-assembled state, FIGS. 2, 3 the assembled filter element of FIG. 1 in different perspective views, FIG. 4 the assembly group with preassembly group and fluid cell in a longitudinal section, FIG. 5a, b, c representations illustrating the assembly of the assembly group of FIG. 4, FIG. 6a, 6b the filter device with assembly group according to filter head of an internal combustion engine in a longitudinal section, FIG. 7 a fastening flange provided on the fluid cell housing for attaching the assembly group with the filter element, FIG. 8a, 8b an adjusting device for adjusting the valve devices between an open position and a closed position, FIG. 9 the filter housing cover of the filter housing, FIG. 10 the assembly group with filter housing bowl installed in the fluid cell housing.
Figure 2:
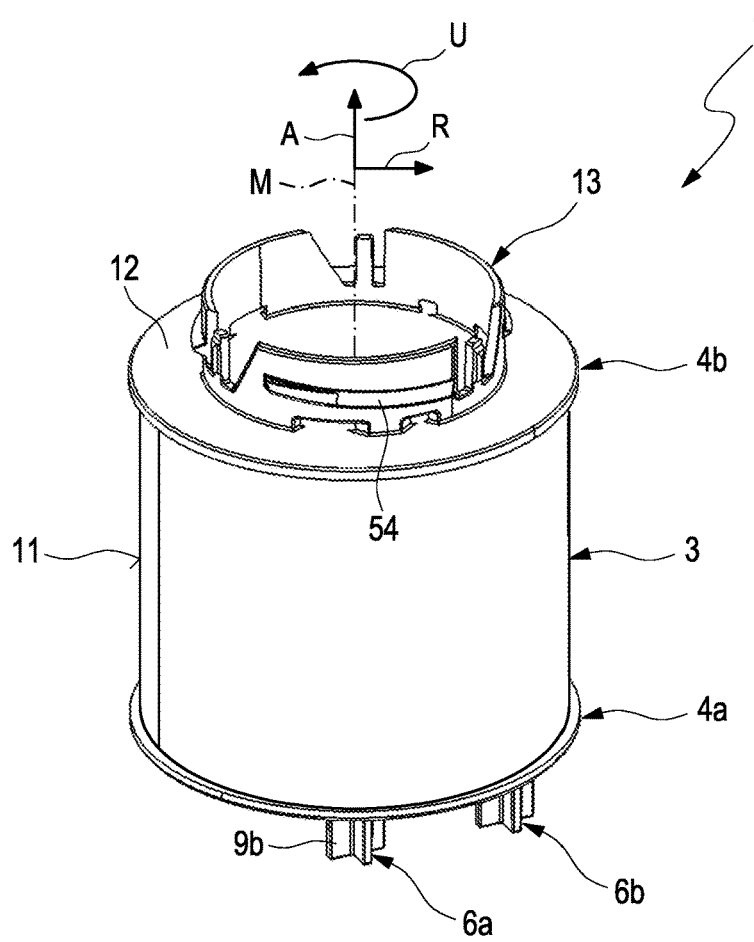
Figure 3:
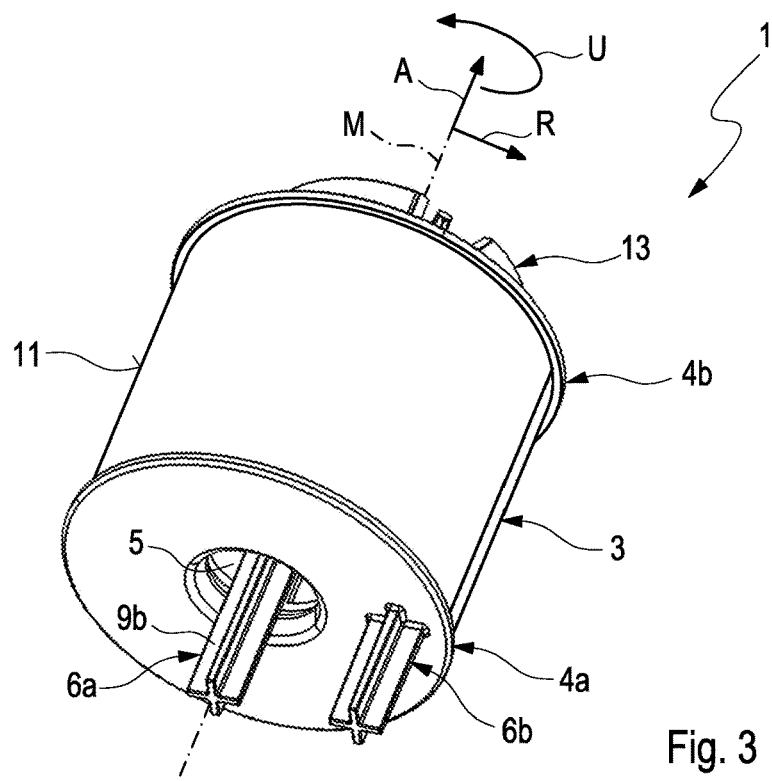

The FIGS. 1 to 3 show an example of a filter element 1 according to the invention. The FIG. 1 shows the essential components of the filter element 1 prior to the assembly, the FIGS. 2 and 3 an assembled state in two different perspective views.

The filter element 1 comprises a support structure 2 which extends along an axial direction A. On the circumference side, an annular or hollow-cylindrical filter medium 3 consisting of filter material, for example of a non-woven fabric or filter paper is arranged on the support structure 2. The axial direction A extends along a centre longitudinal axis M of the annular or hollow-cylindrical filter medium 3. A radial direction R extends perpendicularly away from the centre longitudinal axis M, a circumferential direction U circulates about the centre longitudinal axis M. The axial direction A, the radial direction R and the circumferential direction U each extend orthogonally relative to one another.

As is evident from FIG. 1, the filter element 1 comprises an annular first end disc 4a, which encloses a passage opening 5. From the representation of the FIG. 3 it is evident that with the assembled filter element 1 the passage opening 5 is passed through by a first pin element 6a so that the same projects out of the passage opening 5 along the axial direction A. In an alternative embodiment, the pin element 6a can be connected to the first end disc 4a via webs, in particular via at least three webs. In this exemplary embodiment, the pin 6a is positioned further centrally in the passage opening 5 but is nevertheless a part of the first end disc 4a and does not project through the same. Apart from this, a second pin element 6b laterally projects from the first end disc 4a spaced apart from the first pin element 6a in the axial direction A away from the filter medium 3. The two pin elements 6a, 6b can substantially have the same geometrical shape. In the example of FIGS. 1 to 3, the two pin elements 6a, 6b each for example have the geometrical shape of a cross in a cross section perpendicularly to the axial direction A. On the two pin elements 6a, 6b, valve bodies (not shown here) each for closing valve openings can be arranged.

According to FIG. 3, the first pin element 6a and the first end disc 4a are arranged concentrically relative to one another. Apart from this, the first pin element 6a is also concentrically arranged relative to the passage opening 5.

According to FIG. 1, the support structure 2 is formed as a grating structure with the geometry of a tubular body. Here, the grating structure 7 limits a tubular body interior 8 in which the first pin element 6a extends in certain portions. Thus, a main portion 9a of the first pin element 6a extends within the tubular body interior 8 and merges into an end portion 9b along the axial direction A, which engages through the passage opening 5 of the first end disc 4a and axially projects out of the passage opening 5. In addition, the filter element 1 comprises a second end disc 4b which is located opposite the first end disc 4a along the axial direction A. Thus, the filter medium 3 is axially arranged between the two end discs 4a, 4b. The filter medium 3 and thus also the filter element 1 are thus limited by the two end discs 4a, 4b along the axial direction A. Practically, the two end discs 4a, 4b are formed circularly. In contrast with the first end disc 4a, the second end disc 4b does not enclose a passage opening. In an embodiment alternative to this, the upper end disc can comprise a bypass passage with a bypass valve which is fastened to the filter housing or to the filter element 1.

According to FIG. 1, the support structure 2 is connected to the second end disc 4a and projects from the same towards the first end disc 4a along the axial direction A. In an alternative configuration thereto, the support structure 2 can also be floatingly arranged between the two end discs 4a, 4b. Here, the support structure 2 is passed through by a circular or cylindrical opening 10 formed in the annular or hollow-cylindrical filter medium 3 and extending along the axial direction A. Practically, the two pin elements 6a, 6b, the support structure 2 and the two axial end discs 4a, 4b are formed material-uniformly. A suitable plastic is possible for example as material. Preferably, the first pin element 6a is integrally moulded on the second end disc 4b and the second pin element 6b integrally on the first end disc 4a. Finally, a fastening device 13 for adjustably connecting the filter element 1 to a filter housing cover (not shown in the FIGS. 1 to 3) can be provided on a side 12 of the second end disc 4b facing away from the filter medium 3 can be provided.

Figure 4:
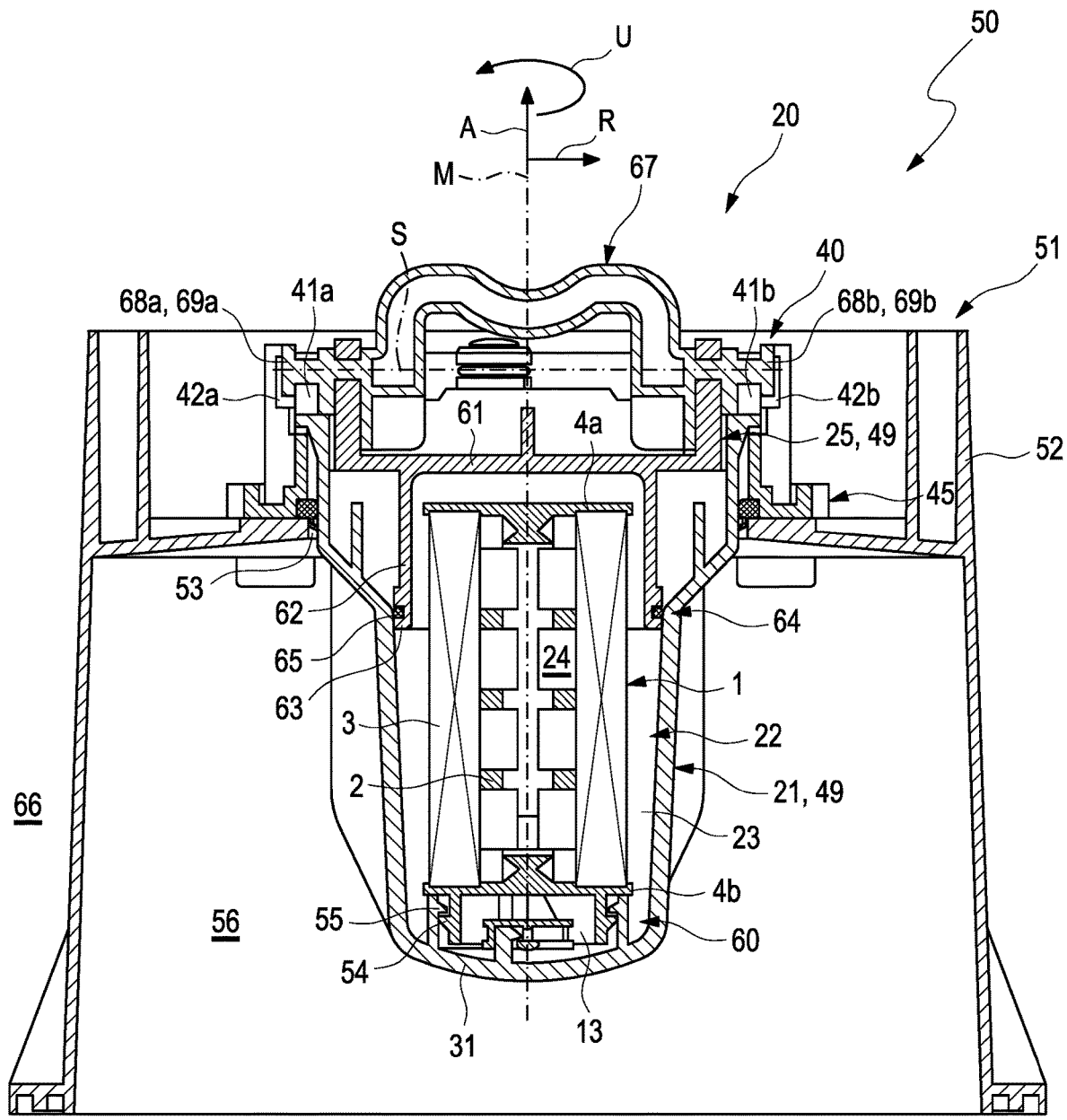

FIG. 4 shows in a longitudinal section an example of an assembly group 50 according to the invention. The assembly group 50 comprises a preassembly group 20 and a fluid cell 51 which according to FIG. 4 comprises a fluid cell housing 52.

The fluid cell housing 52 limits a fluid cell housing interior 56 in which fluid, in particular oil can be stored.

In the fluid cell housing 52 a fluid cell opening 53 is provided, in which the preassembly group 20, in particular the filter housing bowl 21, can be inserted. The preassembly group 20 and the fluid cell 51 together form an assembly group.

Besides the filter element 1 already explained in connection with the FIGS. 1 and 3, the preassembly group 20 comprises a filter housing 49 which limits a housing interior 22 and comprises an open-design filter housing bowl 21 and a filter housing cover 25 closing the filter housing bowl 21.

In the example of the figures, the filter housing bowl 21 is formed cylindrically, wherein an axial direction A of the filter housing 49 extends along the centre longitudinal axis M of the same. A radial direction R extends orthogonally away from the centre longitudinal axis M, a circumferential direction U circulates about the centre longitudinal axis M. For illustration, reference is made to FIG. 9 which shows the filter housing bowl 21 in a separate, perspective representation.

For as long as the filter housing cover 25 does not close the filter housing bowl 21 the filter element 1 can be replaceably inserted in the housing interior 22 and again removed from the same. In addition, the filter housing cover 25 can also be detachably fastened to the fluid cell housing. This scenario is shown in FIG. 4 in which the filter housing cover 25 is fastened to the fluid cell housing 52 and at the same time closes the filter housing bowl 22 of the filter housing 49 received in the fluid cell opening 53 of the fluid cell housing 52.

With the filter element 1 arranged in the housing interior 22, the same subdivides the housing interior 22 into a raw side 23 and into a clean side 24. In the exemplary scenario of FIG. 4, the clean side 24 is arranged radially within the side 23 so that the fluid or oil to be filtered flows from radially outside to radially inside through the filter medium 3 of the filter element 1. Obviously an obverse radial arrangement of raw side 23 and clean side 24 is also conceivable in versions in such a manner that the side 23 is arranged radially within the clean side 24 and the fluid to be filtered consequently flows from radially inside to radially outside through the filter medium 3 of the filter element 1. The filter element 1 that is replaceably arranged in the housing interior 22 can be adjusted from the operating position shown in FIG. 4, in which the filter element 1 is fixed on the filter housing 49, by a rotation about the centre longitudinal axis or fluid cell housing A, i.e. along the circumferential direction U, into a filter element insertion position. In this filter element insertion position, the filter element 1, the filter housing cover 25 removed from the filter housing bowl 21, is removable from the open filter housing bowl 21 through a movement along the axial direction A relative to the same. This function is realised through a connection 60, in particular through a bayonet joint or through a suitable clip-type connection, by means of which the filter element 1 arranged in the housing interior 22 is connected to the filter housing bowl 21. With the help of the connection 60, the filter element that is replaceably arranged in the housing interior 22 can be adjusted out of the operating position, in which the filter element 1 is fixed on the filter housing 49 or in the filter housing bowl 21, through a rotation fluid cell housing A, into the filter element insertion position. In the filter element insertion position the filter element 1, with the filter housing cover 25 removed from the filter housing bowl 21, can be removed from the filter housing bowl 21 through a movement along the axial direction A relative to the open filter housing bowl 21. The said connection 60 on the filter element-side is formed by the fastening device 13 (see FIGS. 1, 2). The said fastening device 13, which for forming the connection 60 can comprise a slotted guide 54, interacts with a driver 55 provided on the bowl bottom 31 of the filter housing bowl 21.

Practically, the filter element 1 is preassembled in the filter housing bowl 21 of the filter housing 49 before the filter housing bowl 21 is arranged with the filter element 1, as shown in FIG. 4, as a unit in the fluid cell housing 52. Alternatively to this it is also conceivable however to preassemble the filter housing bowl 21 in the fluid cell housing 52 and assemble the filter element 1 in the filter housing bowl 21 already arranged in the fluid cell housing 52 only thereafter.

The filter housing cover 25 shown in the longitudinal section of FIG. 4 can, in an analogous manner to the filter housing bowl 21, can substantially have the geometrical shape of a cylinder. Here, the filter housing cover 25 is formed in such a manner that it can be inserted into the filter housing bowl 21 along the axial direction A, in which it can be again removed from the filter housing bowl 21. This is possible independently of whether the filter housing bowl 21 has already been preassembled on the fluid cell housing 52 or not. Following the assembly of the filter element 1 in the filter housing bowl 21, the filter housing cover 25 is typically inserted into the filter housing bowl 21 and the preassembly group 20 formed in this way. For forming a plug connection between the filter housing bowl 21 and the filter housing cover 25, the filter housing cover 25 comprises a cover bottom 61 from which a cover collar 62 projects axially. In the state the filter housing cover 25 inserted in the filter housing bowl, this cover collar 62 lies against a circumferential wall of the filter housing bowl 21 with an axial end portion 63 facing away from the cover bottom 61. In this way, a plug connection 64 is formed between the filter housing cover 25 and the filter housing bowl 21. In the region of the plug connection 64, a sealing device 65 with a sealing element, in particular in the form of an O-ring, can be provided, which seals the raw side 23 relative to the outer circumference 66 of the filter housing 49.

Following the arranging of the preassembly group with the filter housing bowl 21 and the filter housing cover 25 in the fluid cell housing 52, as shown in FIG. 4, the filter housing cover 25 is in an insertion position. The filter housing cover 25, emanating from the insertion position, can be rotated relative to the fluid cell 51 into an operating position, in which it can no longer be removed from the fluid cell housing 52 of the fluid cell 51 along the axial direction A. In the insertion position, the filter housing cover 25 is thus axially fixed in the filter housing bowl 21. The rotational movement takes place along the circumferential direction U, i.e. in a rotary plane that is perpendicular to the axial direction A. In order to again remove the filter housing cover 25 and the filter housing bowl 21 as preassembly group 20 from the fluid cell housing 52 it is essential to initially rotate the filter housing cover 25 again back out of the operation position into the insertion position.

As is illustratively confirmed by FIG. 4, a fold-out handle 67 is provided on the filter housing cover 25, which may serve for removing the filter housing cover 25 from the filter housing bowl 21 along the axial direction A and for rotating the filter housing cover 25 relative to the fluid cell 51 along the circumferential direction U. This handle 67 is designed so as to be foldable or pivotable about a pivot axis S, which extends orthogonally to the axial direction A according to FIG. 4.

The detachable fastening of the filter housing cover 25 described above and the fixing of the filter housing bowl 21 on the fluid cell housing 52 accompanied by this can technically take place with the help of a connection—this can for example be realised as a bayonet joint 40—by means of which the filter housing cover 25 is not only easily attached to the fluid cell housing 52, but the filter housing bowl 21 can also be fixed to the fluid cell housing 52 at the same time. The filter housing cover 25 fixed on the fluid cell housing 52 by means of the bayonet joint 40 blocks an axial removal of the filter housing bowl 21 from the fluid cell housing 52.

The said bayonet joint 40 can be formed on the filter housing cover side on the handle 67 of the filter housing cover 25 introduced above. To this end, two fastening elements 68a, 68b are provided on the handle 67 according to FIG. 4, which can be formed in the manner of extensions 69a, 69b.

The fastening elements 68a, 68b or the extensions 69a, 69b extend the handle 67 along the pivot axis S and lie opposite one another along this pivot axis S. The two fastening elements 68a, 68b can be integrally moulded on the handle 67 as shown. The fastening elements 68a, 68b make possible fixing the handle 67 and thus the entire filter housing cover 25 on the fluid cell housing 52 of the fluid cell 51.

Figure 5C:
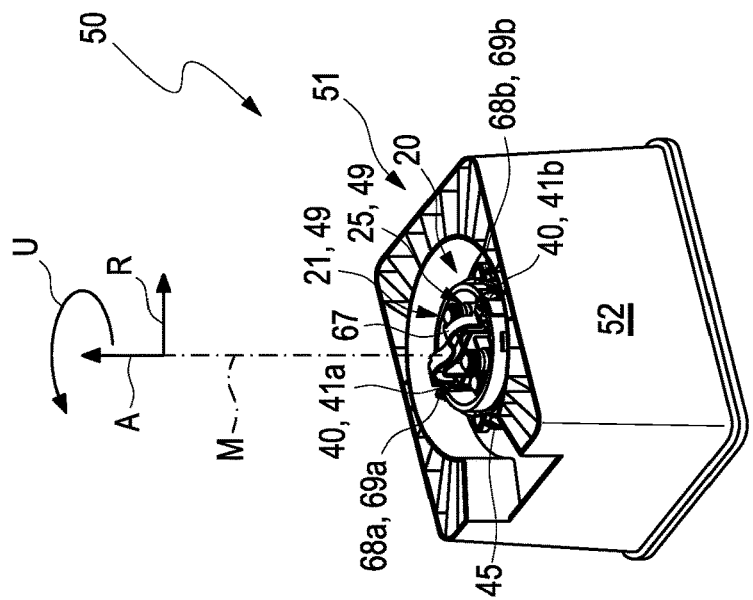
Figure 5B:
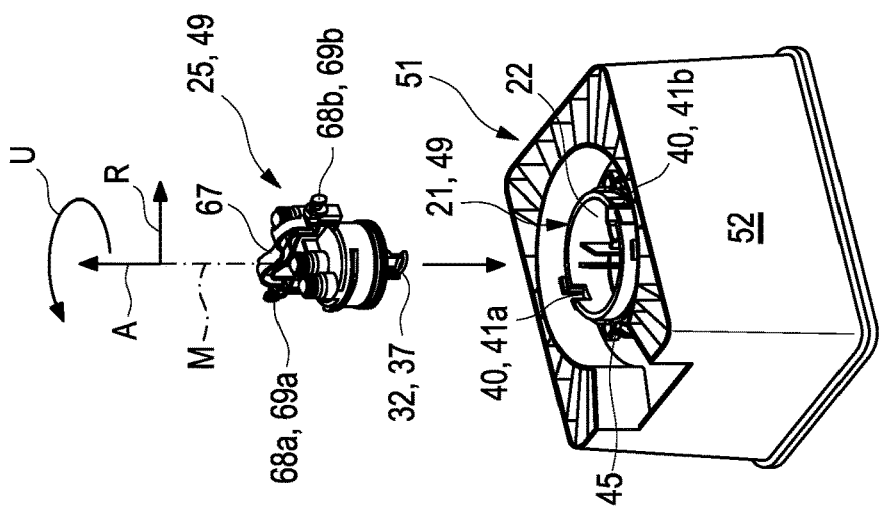
Figure 5A:
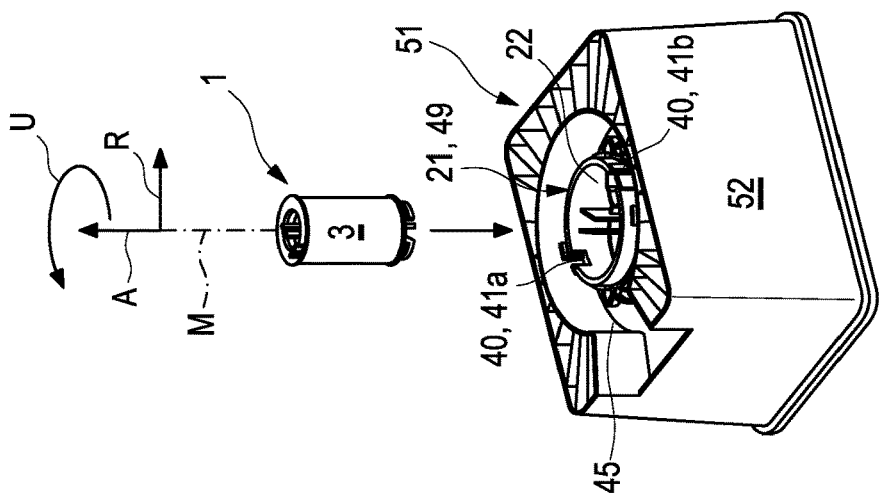

In the following, the functioning of the connection formed as bayonet joint 40 is explained by way of the FIGS. 5a, 5b and 5c. Here, the FIGS. 5a-5c illustrate a version of the assembly of the assembly group 50, in which the filter housing bowl 21 is initially arranged in the fluid cell opening 53 of the fluid cell housing 52 of the fluid cell 51 without the filter element 1. According to FIG. 5a, the filter element 1 is also fastened to the filter housing bowl 21 through axial insertion in the housing interior 22 only after completed assembly of the filter housing bowl 21 in the fluid cell housing 52.

Following this, the filter housing cover 25, as shown in FIG. 5b, is inserted in the filter housing bowl 21 along the axial direction A using the handle 67. Following this insertion, the filter housing cover 25 is in its insertion position.

As part of the bayonet joint 40, two recesses 41a, 41b which are complementary to the two fastening elements 68a, 68b are provided on the filter housing bowl 21, in which the two fastening elements 68a, 68b or extensions 69a, 69b can engage with the filter housing cover 25 inserted in the filter housing bowl 21. The two recesses 41a, 41b are designed open along the axial direction A. Accordingly, two recesses 42a, 42b are provided on the fluid cell housing 52 as part of the bayonet joint 40, in which the fastening elements 68a, 68b provided on the filter housing cover 25 can likewise engage. The recesses 42a, 42b co-forming the bayonet joint 40, are arranged on a circumferential wall 44 of the fuel cell housing 52 on the inside, which forms a fastening flange 45 for fastening the filter housing 25.

Figure 7:
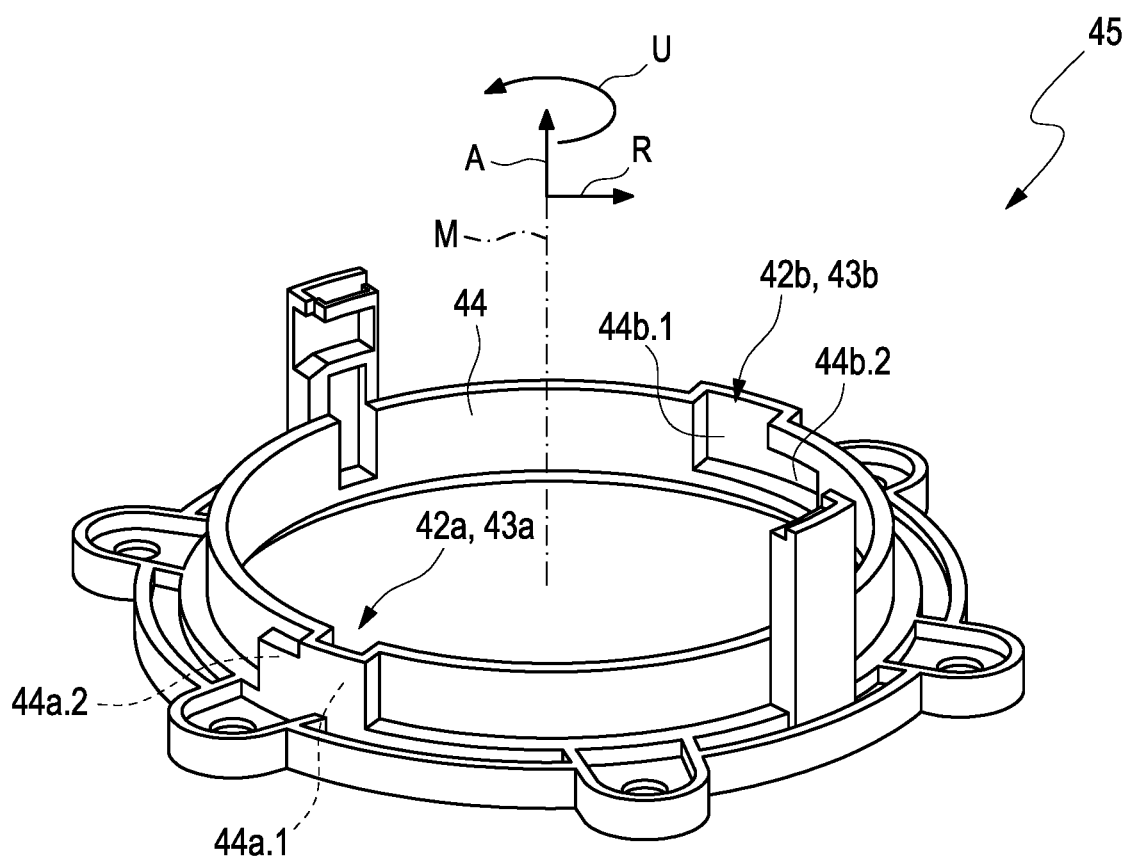

Such a fastening flange 25 can be formed as a component that is separate relative to the fluid cell housing 52 and be fastened to the actual fluid cell housing 52 with the help of a screw connection. For illustration, the annularly formed fastening flange 45 is shown in a perspective representation in FIG. 7. The two recesses 42a, 42b can each be formed as receiving groove 43a, 43b according to FIG. 7. Each of the two receiving grooves 43a, 43b comprises a first groove portion 44a.1, 44b.1 extending along the axial direction A, in which the fastening elements 68a, 68b provided on the handle 67, engage during the axial insertion of the filter housing cover 25 in the filter housing bowl 21 in order to move the filter housing cover 25 into the insertion position. In each of the two receiving grooves 43a, 43b, the respective first groove portion 44a.1, 44b.1 merges into a second groove portion 44a.2, 44b.2, which for the rotational adjusting of the filter housing cover 25 from the assembly position into the operation position extends along the circumferential direction U.

Following the insertion of the filter housing cover 25 in its insertion position, the two fastening elements 68a, 68b or extensions 69a, 69b of the handle 67 engage in the two recesses 42a, 42b provided on the fluid cell housing 52 and forming a part of the bayonet joint 40 and in the process simultaneously engage through the recesses 41a, 41b provided on the filter housing bowl 21 along the radial direction R. Thus, during the rotational adjusting of the filter housing cover 25 from the insertion position into the operation position and back into the insertion position, the filter housing bowl 21 with the filter element 1 are driven by the fastening elements 68a, 68b or the extensions 69a, 69b provided on the handle 67. As explained above, the fluid cell housing 51 of the fluid cell 51 and the filter housing bowl 21 of the filter housing 49 are designed and matched to one another for forming the bayonet joint 40 in such a manner that following an axial insertion of the filter housing bowl 21 into the fluid cell housing 52, the recesses 42a, 42b provided on the fluid cell housing 52 and the recesses 41a, 41b provided on the filter housing bowl are aligned with one another along the radial direction R.

Following this, the handle 67 and thus also the entire filter housing cover 25 are rotated about the centre longitudinal axis M which is shown in FIG. 5c. Following this rotational movement, the filter housing cover 25 is in its operating position.

Figure 6:
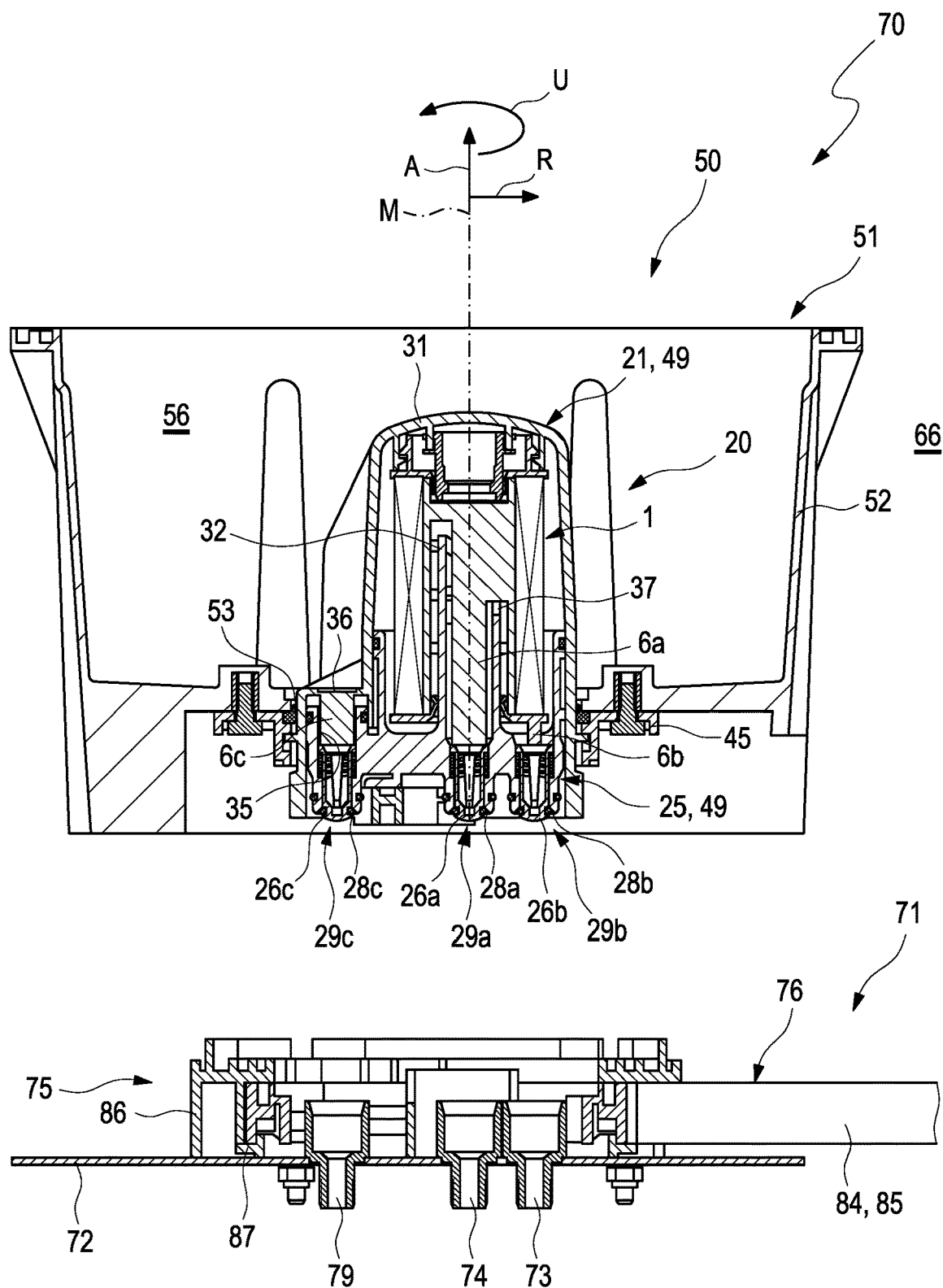
Figure 6:
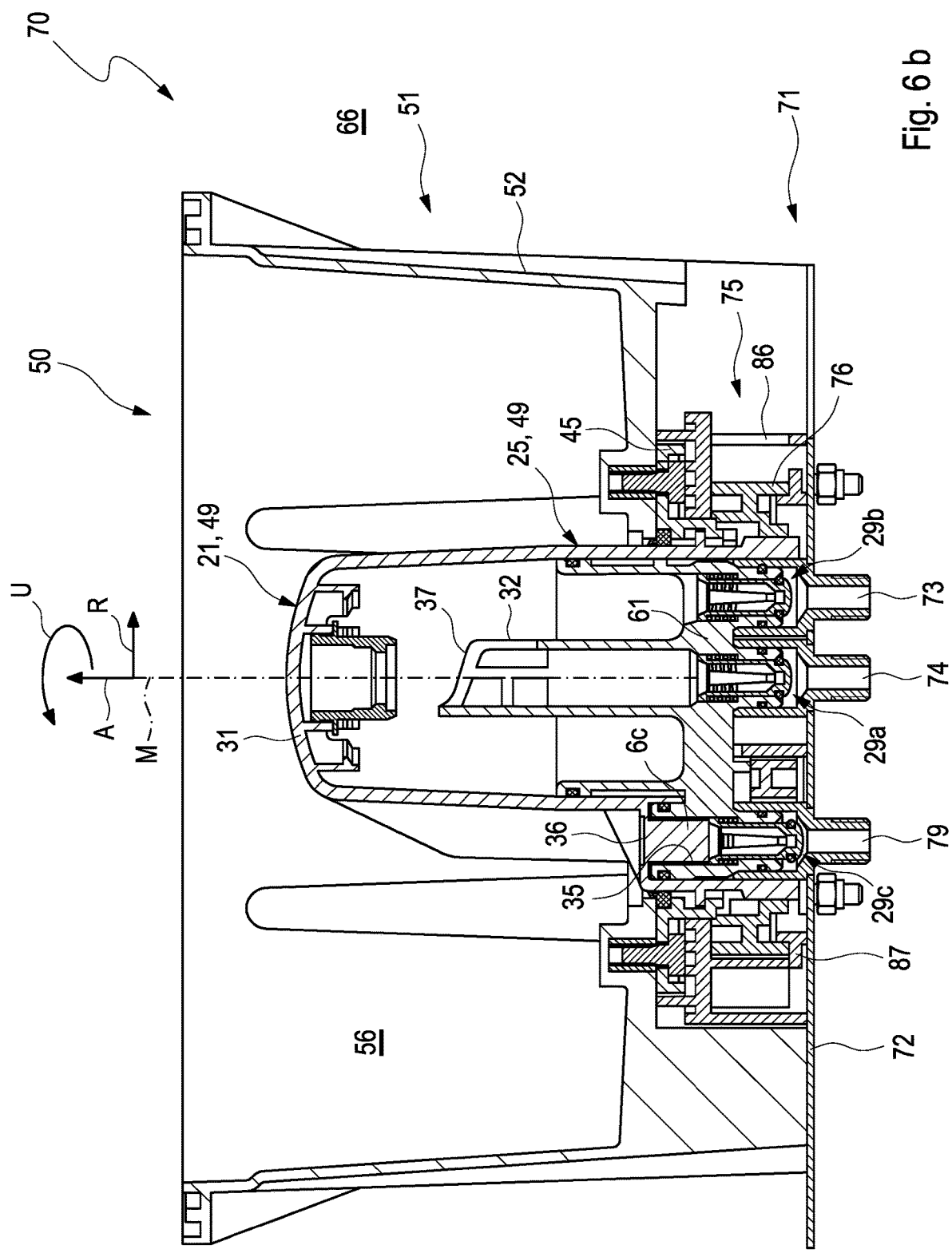

The resulting installation situation is shown in FIG. 6a which analogous to FIG. 4 shows a longitudinal section of the assembly group 50 with a preassembly group 20 however in another section plane. As the representation of the FIG. 6a illustrates, a first valve opening 28 is provided on the filter housing cover 25 fixed in place relative to the same, together with which the first valve body 26a forms a first valve device 29a. Analogous thereto, a second valve opening 28b is provided on the filter housing cover 25 fixed in place relative to the same, together with which the second valve body 26b forms a second valve device 29b. The two valve openings 28a, 28b are arranged on a cover bottom 61 of the filter housing cover 25. Both in the insertion position and also in the operation position of the filter housing cover 25, the first pin element 6a is aligned with the first valve opening 27a of the first valve device 29a. Analogously, the second pin element 6b is aligned with the second valve opening 28b of the second valve device 29b. In the state shown in FIG. 6a, the two pin elements 6a, 6b close the two valve openings 28a, 28b.

The assembly group 50 with the preassembly group 20 and the fluid cell 51 shown in FIG. 6a is part of a filter device 70, which in addition to the assembly group 50 comprises a filter head 1 with a flange 72 on which the assembly group 50 can be fitted along the axial direction A. On the filter head 71 of the filter device 70, a raw oil connection 73 and a clean oil connection 74 are provided, which in a state of the assembly group 50 fitted onto the flange 72—this state is shown in FIG. 6b—fluidically communicate with the first and second valve opening 28a, 28b of the filter housing cover 25.

As is additionally evident from FIG. 6a, a third pin element 6c with a third valve body 26c can be provided in addition to the first and second pin element 6a, 6b, 6c on the filter housing bowl 21, by means of which a third valve opening 28c formed on the filter housing cover 25 can be closed or opened for fluid, in particular oil to flow through. The third valve device 29c formed by the third valve opening 28c and the third valve body 26c is arranged in a fluid line 35 which is formed in the filter housing cover 25. In an assembled state of the assembly group 50 the fluid line 35 communicates with the fluid cell housing interior 56 via an opening 36 formed in the filter housing cover 25 (also shown in FIG. 9).

When the preassembly group 20 is mounted on the fluid cell 51, the fluid line 35 fluidically connects the fluid cell housing interior 56 limited by the fluid cell housing 51 with an additional oil connection 79 provided on the filter head 71. In this way—analogously to the first and second valve device—the fluid flow or oil flow of the oil or fluid stored in the fluid cell 52 can be steered into the filter head 71 and vice versa. In particular, an undesirable leakage of oil from the fluid cell housing interior 56 of the fluid cell 52 can be avoided.

According to the FIGS. 6a and 6b, the filter device 70 comprises an adjusting device 75. By means of the adjusting device 75, the filter housing bowl 22 with the filter element 1 and the pin elements 6a, 6b provided on the filter element 1 can be adjusted along the axial direction A relative to the filter housing cover 25 with the valve openings 28a, 28b. In this way, the filter housing bowl 21 can be adjusted between a closed position, in which the pin elements 6a, 6b close the valve openings 28a, 28b in a fluid-tight manner, and an open position, in which the pin elements 6a, 6b open the valve openings 28a, 28b for raw or clean oil to flow through.

In order to impart the filter housing bowl 21 the required axial adjustability, the respective second groove portion of the receiving grooves 43a, 43b that are present on the fluid cell housing 52 is dimensioned in the axial direction A in such a manner that the filter housing bowl 21 can be axially adjusted between the open position and the closed position. Here, the filter head 71 and the assembly 50 are equipped or matched to one another in such a manner that the filter housing cover is in the closed position for as long as the assembly group 50 is not arranged on the filter head 71. Thus, the filter head 71 and the assembly group 50 are thus equipped or matched to one another in such a manner that such a manner that the two pin elements 6a, 6b close the two valve openings 28a, 28b for as long as the assembly group 50 is not arranged on the filter head 71. For opening the valve openings 28a, 28b, an adjusting of the filter housing bowl 21 into its open position is required, which is only possible by means of the adjusting device with the assembly group 50 arranged on the filter head. For adjusting the filter housing bowl 21 from its closed position into the open position by means of the adjusting device 71, the same is mechanically connected to the filter housing bowl 21 with the assembly group 50 fitted onto the flange 72. The adjusting device 71 is designed in such a manner that a rotational movement of the adjusting device 75 about an axis of rotation which extends along the axial direction A, is accompanied by an adjusting movement of the adjusting device 75 and thus also of the filter housing bowl 21 that is mechanically connected to the adjusting device 75 along the axial direction A.

On the filter housing cover 25, a positioning aid 32 formed tubular body-like can be moulded for positioning the filter element 1 with the pin elements 6a, 6b relative to the valve openings 28a, 28b provided on the filter housing cover 25. Practically, the face end of the tubular body-like positioning aid 32 facing away from the filter housing cover 25 can comprise a chamfer. In this way, the filter element 1 with the pin elements 6a and 6b is not only radially positioned or centred in the housing interior 22 but also rotationally positioned so that the two pin elements 6a, 6b of the filter element 1 already assembled in the filter housing bowl 21 are aligned with one another relative to the valve openings 28a provided on the filter housing cover 25 as desired when the filter housing cover 25 is inserted into the filter housing bowl 21.

Figure 8:
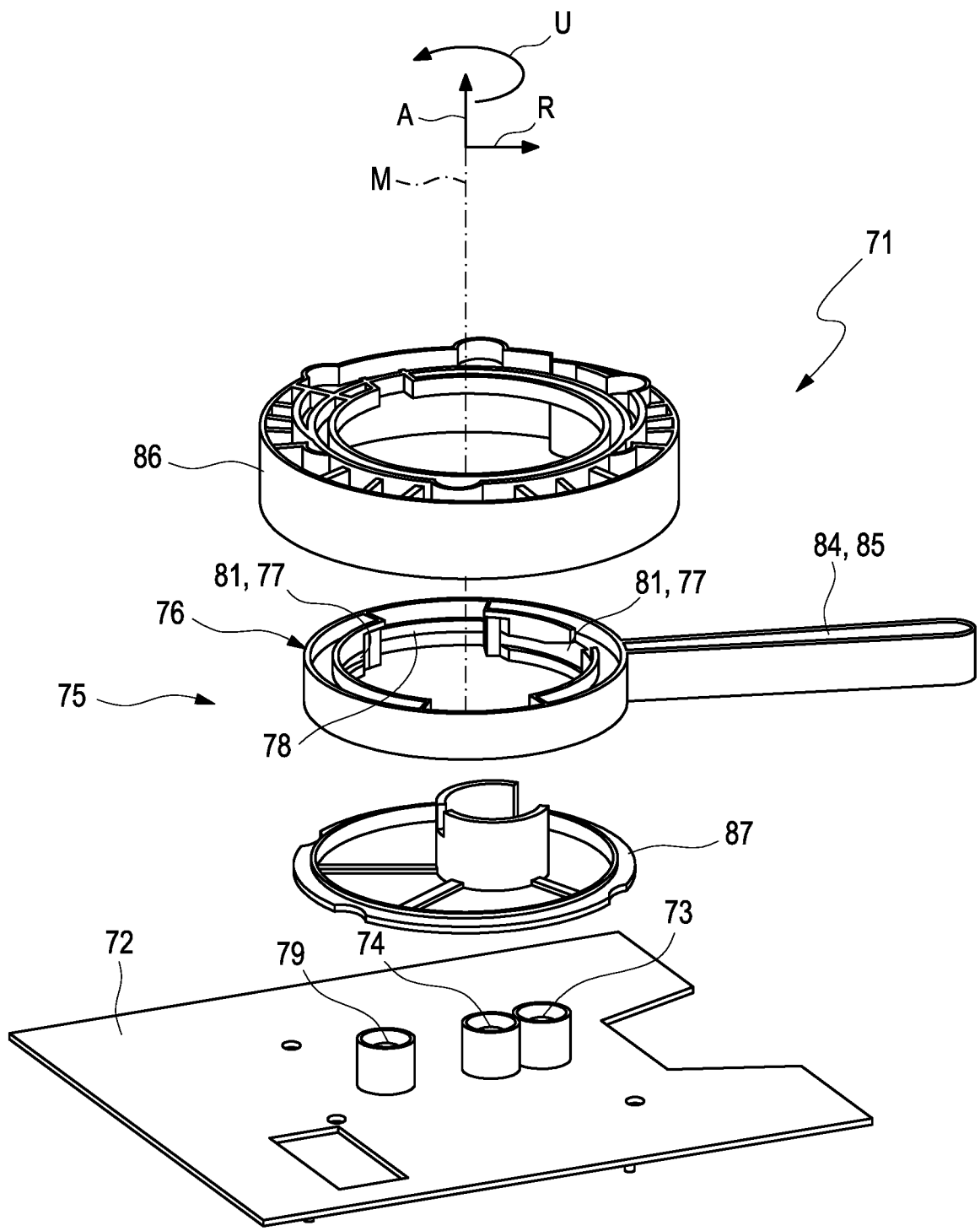
Figure 8:
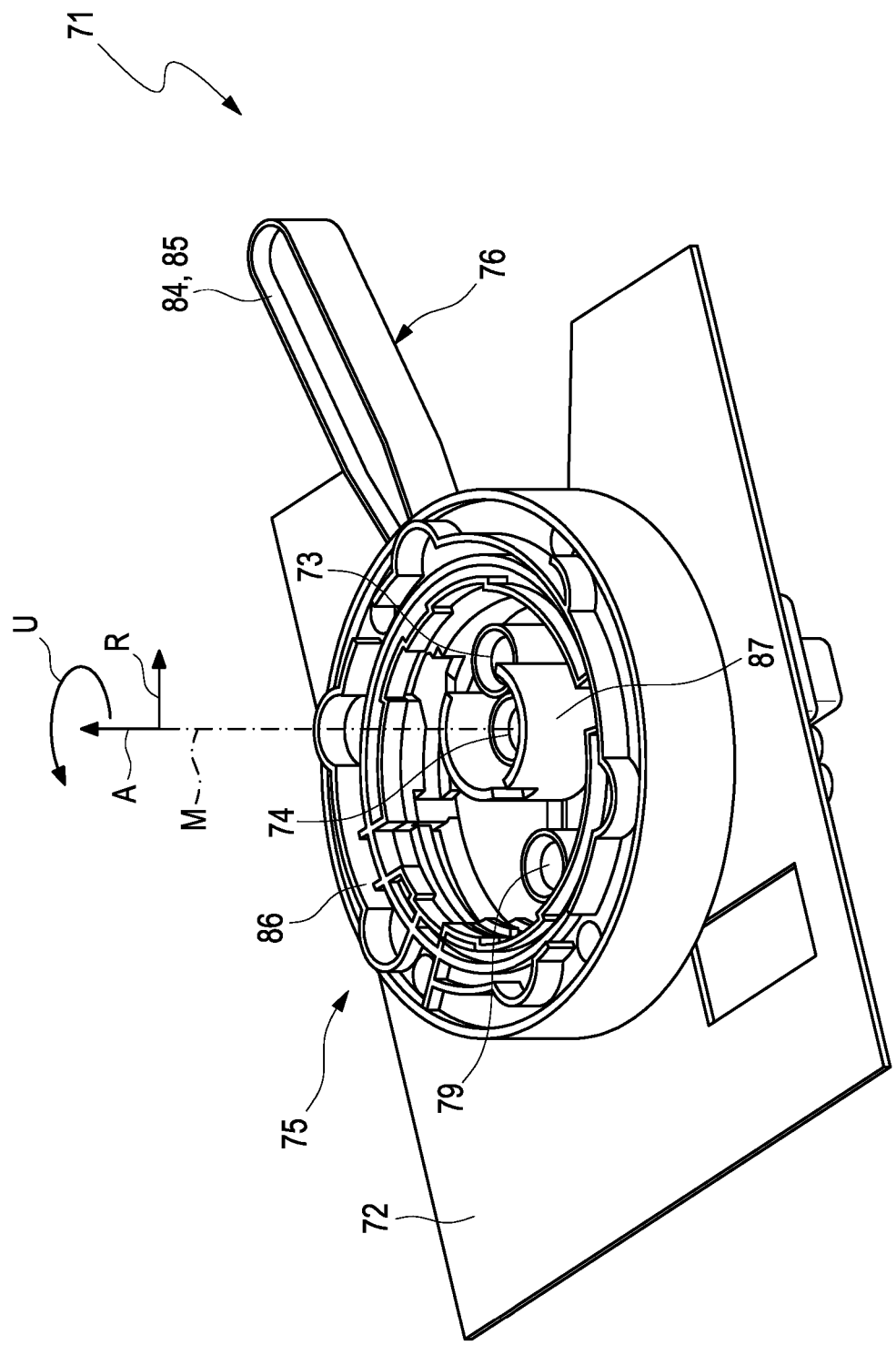

For illustrating the adjusting mechanism explained above, the FIGS. 8a and 8b show the construction of the filter head 71 with the adjusting device 75 in a separate representation. The FIG. 8a shows an isometric view, FIG. 8b is an exploded representation of the FIG. 8a. According to the FIGS. 8a, 8b, the adjusting device 75 comprises an annular adjusting body 76 which in the state of the assembly group 50 mounted on the filter head 71 is mechanically adjustably connected to the filter housing bowl 21. This adjustable mechanical connection between the filter housing bowl 21 and the adjusting device 75 or the adjusting body 76 is realised by way of a further bayonet joint—additional to the bayonet joint 40—, which in the following is referred to as filter head bayonet joint 77. In the example of the FIGS. 8a and 8b, the filter head bayonet joint 77 altogether comprises four receiving grooves 81 formed on the inner circumference 78 of the adjusting body 76 formed on the adjusting body, each of which have an axial gradient along the circumferential direction U of the adjusting body.

Figure 9:
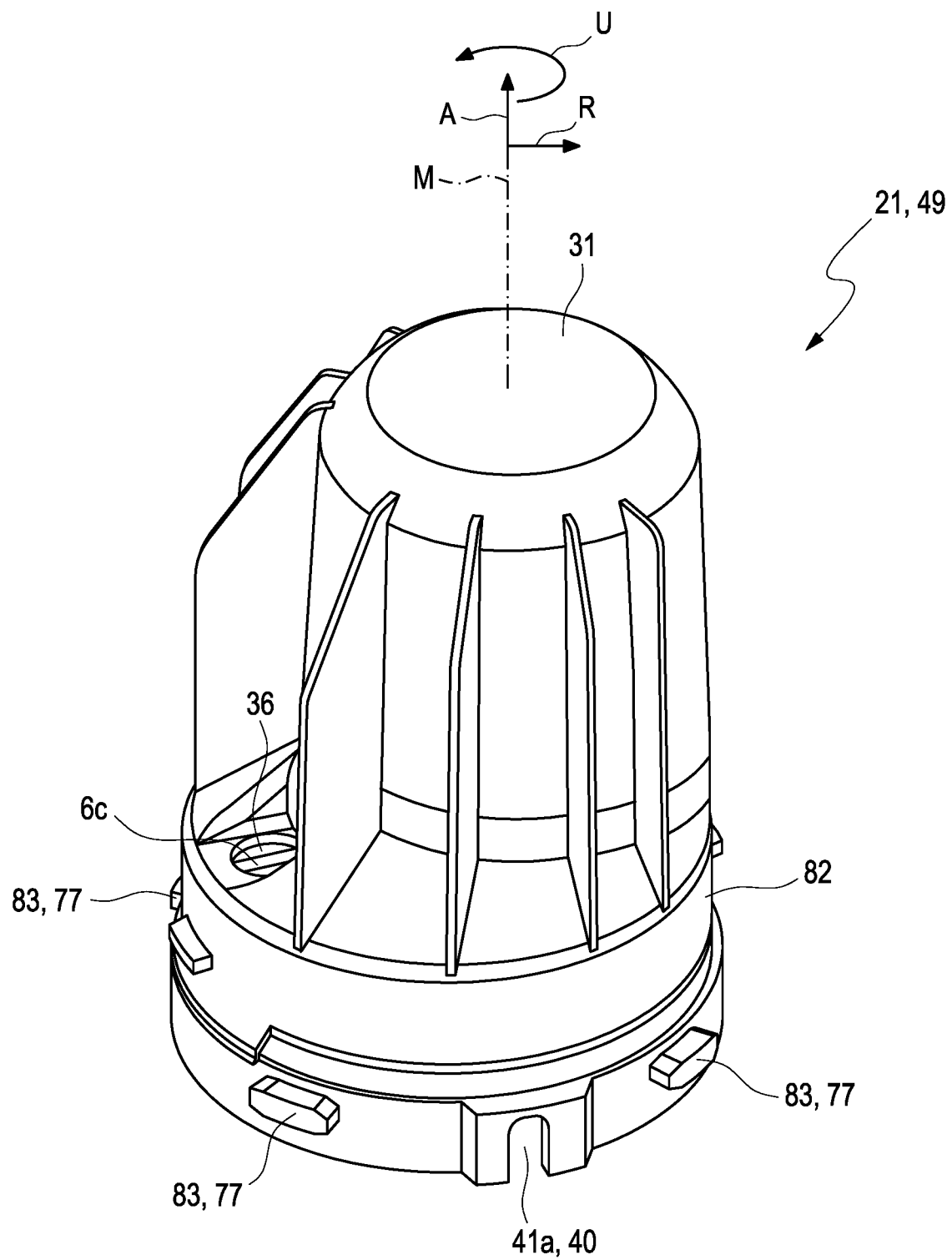

For each of these receiving grooves 81, the filter head bayonet joint 77 according to FIG. 9—this figure shows the filter housing cover 25 separately in a perspective representation—comprises a projection 83 arranged on the outer circumference 82 of the filter housing bowl 21, which in the state of the assembly group 50 or preassembly group 20 mounted on the filter head 71 engages in the receiving groove 81 respectively assigned to it (not shown in FIG. 9). The receiving grooves 81 and the associated projections 83 of the filter head bayonet joint 77 are formed and matched to one another in such a manner that a rotation of the adjusting body 77 fluid cell housing A brings about an axial movement of the filter housing bowl 21 so that the filter housing bowl 21 in this way is adjusted between its open position and its closed position.

Figure 10:
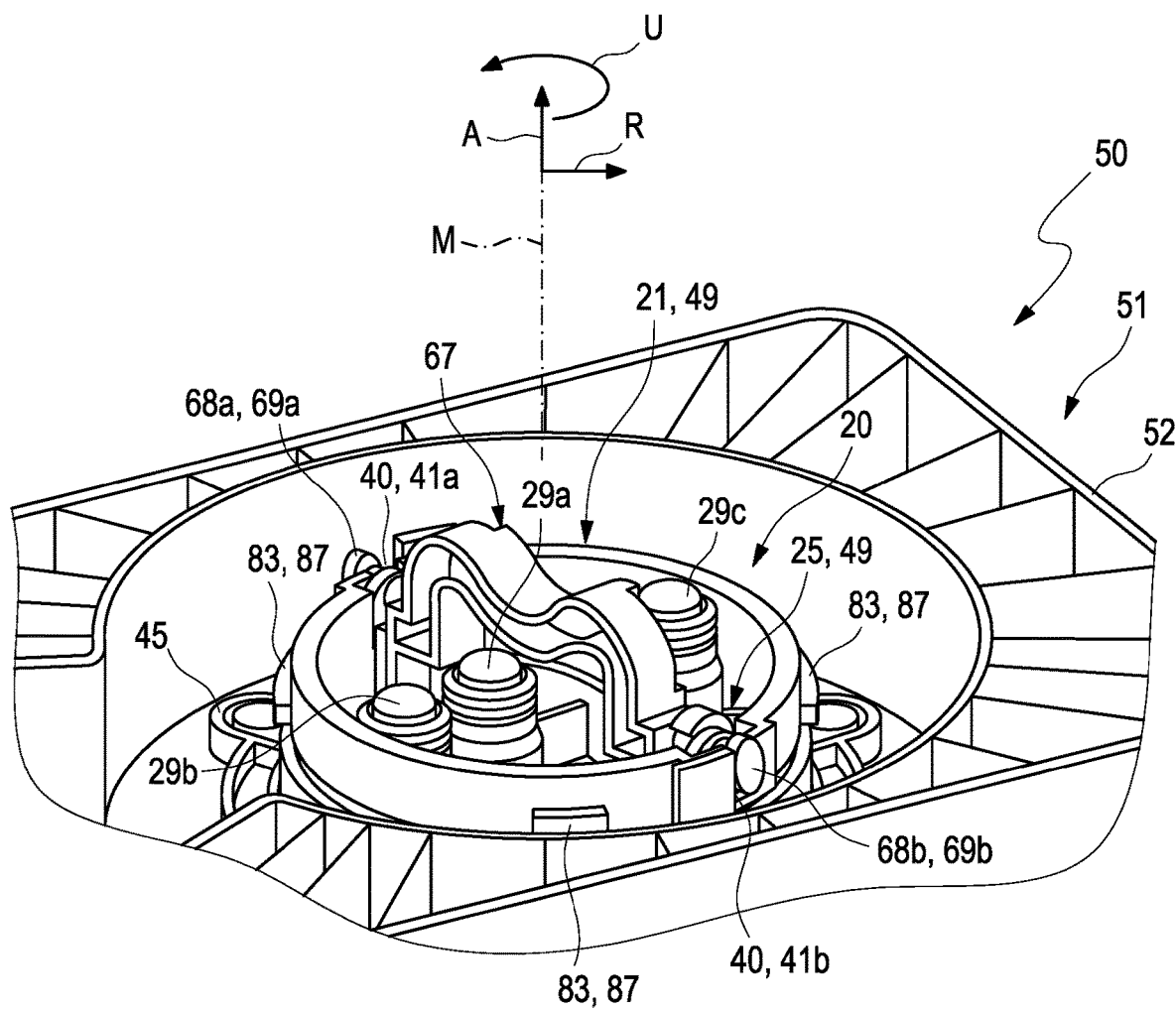

FIG. 10 shows the filter housing cover 25 of FIG. 9 as part of the assembly group 50, i.e. with the filter housing bowl 21 received in the fluid cell housing 52 of the fluid cell 51. In the exemplary scenario, the receiving grooves 81 and the projections 83 respectively are equidistantly arranged along the circumferential direction U of the adjusting body 75 and the housing bowl 21 respectively. Obviously a non-equidistant arrangement is also conceivable in a version. Likewise, a different number of receiving grooves 81 and projections 83 can be provided than exemplarily selected in the exemplary scenario. Each of the receiving grooves 81 provided on the adjusting body and the projection 83 of the filter head bayonet joint 77 provided on the filter housing bowl 21 and assigned in each case to this receiving groove 81 are matched to one another in such a manner that a rotation of the adjusting body 75 fluid cell housing A brings about an axial movement of the filter housing bowl 21, so that the filter housing bowl 21 in this way is adjusted between the open position and the closed position. In order to make it easier for a worker to rotate the adjusting body 75, an actuating element 84 in the form of a handle 85 can be provided on the same.

As is evident from the FIGS. 8a and 8b, the adjusting device 75 can comprise a retaining ring 86 by means of which the adjusting body 76 is axially fixed on the flange 72. The adjusting body 76 and the retaining ring 86 are formed or matched to one another in such a manner that the rotatability of the valve body 76 along the circumferential direction U remains ensured. To this end, a guide ring 87 can be provided on the flange 71, which makes possible a defined rotational movement of the adjusting body 76 along the circumferential direction U. Practically, the adjusting body 76 and the guide ring 87 are axially arranged between the retaining ring and the flange 72.

The invention claimed is:

1. A filter device for an internal combustion engine, comprising:
a filter head including a flange;
an assembly group arranged on the flange, the assembly group including a preassembly group and a fluid cell;
the preassembly group including:
  a filter housing limiting a housing interior, which comprises an open-design filter housing bowl, and a filter housing cover for closing the filter housing bowl, wherein the filter housing cover is detachably fastened to the filter housing bowl;
  a filter element replaceably arranged in the housing interior, the filter element having:
    a support structure extending along an axial direction, on which on a circumference side an annular filter medium consisting of filter material is arranged; and
    an annular first end disc having a passage opening through which a first pin element is passed, so that the first pin element projects out of the passage opening along the axial direction, wherein a second pin element axially projects from the first end disc laterally spaced apart from the first pin element;
  a first valve opening provided on the filter housing cover, together with which a first valve body forms a first valve device; and
  a second valve opening provided on the filter housing cover, together with which a second valve body forms a second valve device;
the fluid cell including a fluid cell housing defining a fluid cell housing interior configured to store a fluid;
a raw oil connection and a clean oil connection each provided on the filter head and which fluidically communicate with the first and second valve openings of the assembly group;
wherein the preassembly group is received in a fluid cell opening of the fluid cell housing and protrudes into the fluid cell housing interior;
wherein the filter housing bowl and the filter housing cover are at least one of formed and matched to one another in such a manner that the filter housing cover is formed so as to be insertable in the filter housing bowl;
wherein the filter housing cover of the filter housing is detachably fixed on the fluid cell housing via a bayonet joint; and
wherein the filter device comprises an adjusting device via which the filter housing bowl with the filter element and the first and second pin elements provided on the filter element or first and second valve bodies is axially adjustable relative to the filter housing cover with the first and second valve openings between a closed position, in which the first and second valve bodies close the first and second valve openings in a fluid tight manner, and an open position, in which the first and second pin elements open the valve openings for raw or clean oil to flow through.

2. The filter device according to claim 1, wherein the filter head and the assembly group are equipped or matched to one another in such a manner that the first and second pin elements close the first and second valve openings for as long as the assembly group is not arranged on the filter head.

3. The filter device according to claim 1, wherein the filter head and the assembly group are equipped or matched to one another in such a manner that the filter housing bowl is in the closed position for as long as the assembly group is not arranged on the filter head.

4. The filter device according to claim 1, wherein the filter head and the assembly group are equipped or matched to one another in such a manner that an adjusting of the filter housing bowl from the closed position into the open position is only possible with the assembly group arranged on the filter head.

5. The filter device according to claim 4, wherein the adjusting of the filter housing bowl from the closed position into the open position is via the adjusting device.

6. The filter device according to claim 1, wherein:
the adjusting device with the assembly group fitted onto the flange is mechanically connected to the filter housing bowl; and
the adjusting device is designed in such a manner that a rotational movement of the adjusting device about an axis of rotation, which extends along the axial direction is accompanied by an axial adjusting movement of the adjusting device and of the filter housing bowl.

7. The filter device according to claim 1, wherein an adjustable mechanical connection between the filter housing bowl and the adjusting device is realised via a filter head bayonet joint.

8. The filter device according to claim 1, wherein:
the fluid cell housing includes a base and at least one wall;
the at least one wall projects from the base and extends around a periphery of the base such that the at least one wall and the base define the fluid cell housing interior; and
the base includes the fluid cell opening.

9. An internal combustion engine, comprising a filter device having:
a filter head comprising a flange;
an assembly group arranged on the flange, the assembly group having a fluid cell with a fluid cell housing, and a preassembly group receivable in the fluid cell housing, the preassembly group having:
　a filter housing limiting a housing interior, which comprises an open-design filter housing bowl, and a filter housing cover for closing the filter housing bowl, wherein the filter housing cover is detachably fastened to the filter housing bowl;
　a filter element replaceably arranged in the housing interior, the filter element having:
　　a support structure extending along an axial direction, on which on a circumference side an annular filter medium consisting of filter material is arranged; and
　　an annular first end disc having a passage opening through which a first pin element is passed, so that the first pin element projects out of the passage opening along the axial direction, wherein a second pin element axially projects from the first end disc laterally spaced apart from the first pin element;
　a first valve opening provided on the filter housing cover, together with which a first valve body forms a first valve device; and
　a second valve opening provided on the filter housing cover, together with which a second valve body forms a second valve device; and
a raw oil connection and a clean oil connection each provided on the filter head and which fluidically communicate with the first and second valve openings of the assembly group;
wherein the filter housing bowl and the filter housing cover are at least one of formed and matched to one another in such a manner that the filter housing cover is formed so as to be insertable in the filter housing bowl;
wherein the filter housing cover of the filter housing is detachably fixed on the fluid cell housing via a bayonet joint; and
wherein the filter head and the assembly group are equipped or matched to one another in such a manner that the first and second pin elements close the first and second valve openings for as long as the assembly group is not arranged on the filter head.

* * * * *